(12) United States Patent
Chen et al.

(10) Patent No.: US 9,383,610 B2
(45) Date of Patent: Jul. 5, 2016

(54) DISPLAY PANEL WITH AGGLOMERATES FORMED AROUND SPACERS OF SUBSTRATE

(71) Applicant: INNOLUX CORPORATION, Chu-Nan, Miao-Li County (TW)

(72) Inventors: Cheng-Hsiung Chen, Chu-Nan (TW); Yu-Lin Yeh, Chu-Nan (TW); An-Chang Wang, Chu-Nan (TW); Yi-Ching Chen, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 52 days.

(21) Appl. No.: 14/470,226

(22) Filed: Aug. 27, 2014

(65) Prior Publication Data

US 2015/0077679 A1 Mar. 19, 2015

(30) Foreign Application Priority Data

Sep. 16, 2013 (TW) .............................. 102133495 A

(51) Int. Cl.
| | |
|---|---|
| *G02F 1/1339* | (2006.01) |
| *G02F 1/1337* | (2006.01) |
| *G02F 1/1335* | (2006.01) |
| *G02F 1/1343* | (2006.01) |
| *G02F 1/1362* | (2006.01) |

(52) U.S. Cl.
CPC .......... *G02F 1/13394* (2013.01); *G02F 1/1337* (2013.01); *G02F 1/1362* (2013.01); *G02F 1/13439* (2013.01); *G02F 1/133512* (2013.01); *G02F 1/133514* (2013.01); *G02F 1/133528* (2013.01); *G02F 1/133711* (2013.01); *G02F 2001/13398* (2013.01); *G02F 2001/133776* (2013.01)

(58) Field of Classification Search
CPC .............. G02F 1/13394; G02F 1/1337; G02F 1/133528; G02F 1/133514; G02F 1/1362; G02F 1/13439; G02F 1/133711
See application file for complete search history.

(56) References Cited

U.S. PATENT DOCUMENTS

2008/0204645 A1* 8/2008 Kawabe .............. G02F 1/13394
349/123

* cited by examiner

*Primary Examiner* — Joseph L Williams
(74) *Attorney, Agent, or Firm* — Liu & Liu

(57) ABSTRACT

A display panel includes a first substrate having a first alignment film, a second substrate having a second alignment film and plural spacers, a liquid crystal layer disposed between the first and second substrates, and a plurality of agglomerates positioned between the first and second alignment films and further surrounding at least one of the spacers. The spacers maintain a uniform gap between the first and second substrates. The second alignment film is disposed oppositely to the first alignment film and covers the spacers. In one embodiment, sizes of the agglomerates are distributed in a range of 0.1 μm~2 μm.

18 Claims, 4 Drawing Sheets

DISPLAY PANEL WITH AGGLOMERATES FORMED AROUND SPACERS OF SUBSTRATE

This application claims the benefit of Taiwan application Serial No. 102133495, filed Sep. 16, 2013, the subject matter of which is incorporated herein by reference.

BACKGROUND

1. Field of the Invention

The disclosure relates in general to a display panel, and more particularly to a display panel with agglomerates.

2. Description of the Related Art

Today, electronic products with displays, such as smart phones, tablet personal computers (i.e. tablet PC, flat PC, ex: iPad), laptops, monitors, and televisions, are necessary tools for work and leisure in the daily life. Liquid crystal display (LCD) is the most popular displays in use. Being compact in size, light in weight, power-saving and radiation-free, LCDs are the most popular displays in use.

LCD is a flat panel display, electronic visual display, or video display that uses the light modulating properties of liquid crystals. LCD possesses the excellent characteristics such as compact in size, light weight, easy to carry, having reasonable price, higher display quality and operation reliability. Also, viewer's eyes feel much more comfortable looking at a LCD. Older cathode ray tube (CRT) monitors are being replaced by LCD. Currently, LCDs provide a versatile choice in sizes, shapes and resolutions for the consumer. Typically, a uniform cell gap between the substrates of the LCD/display panel is maintained by the spacers. However, the defect of light leakage in the dark state occurs around the spacers of a conventional display panel, due to the liquid crystal molecules adjacent to the spacers are tilted along the surface of the spacers.

SUMMARY

The disclosure is directed to a display panel with agglomerates surrounding the spacers, which reduces the region of light leakage corresponding to the peripheries of the spacers, and consequently improves the light leakage in the dark state.

According to one embodiment of the disclosure, a display panel is provided, comprising a first substrate having a first alignment film, a second substrate having a second alignment film and a plurality of spacers, a liquid crystal layer disposed between the first substrate and the second substrate, and a plurality of agglomerates positioned between the first alignment film and the second alignment film. The agglomerates surround at least one of the spacers. The second alignment film contacts and covers the spacers, wherein the spacers maintain a substantially uniform gap between the first substrate and the second substrate. In one embodiment, the sizes of the agglomerates are distributed in a range of 0.1 µm-2 µm.

According to one embodiment of the disclosure, a display panel is provided, comprising a first substrate, a second substrate, a liquid crystal layer and an orientation patterned polymer layer. The first substrate comprises a first alignment film formed on a surface of a first base. The second substrate comprises a second base apart from the first base, a second alignment film and a plurality of spacers formed on a surface of the second base. The second alignment film is disposed oppositely to the first alignment film and contacts and covers the spacers. The spacers are disposed between the first base and the second base for maintaining a substantially uniform gap between the first base and the second base. The liquid crystal layer is disposed between the first alignment film and the second alignment film. The orientation patterned polymer layer is distributed on the first alignment film and the second alignment film and contacts the liquid crystal layer. The orientation patterned polymer layer comprises a plurality of orientation regions and a plurality of agglomeration regions. The agglomeration regions are respectively positioned between the spacers and the orientation regions. In the orientation patterned polymer layer, a surface roughness of the agglomeration regions is larger than a surface roughness of the orientation regions.

According to one embodiment of the disclosure, a display panel is provided, comprising a first substrate having a first alignment film, a second substrate having a second alignment film and a plurality of spacers, a liquid crystal layer disposed between the first substrate and the second substrate, and a plurality of agglomerates positioned between the first alignment film and the second alignment film. The agglomerates surround at least one of the spacers. The second alignment film contacts and covers the spacers, wherein the spacers maintain a substantially uniform gap between the first substrate and the second substrate. In the embodiment, a degree of polymerization of the agglomerates closer to the spacer for being surrounded is higher than a degree of polymerization of the agglomerates farther to the spacer for being surrounded.

The above and other aspects of the disclosure will become better understood with regard to the following detailed description of the preferred but non-limiting embodiments. The following description is made with reference to the accompanying drawings.

DETAILED DESCRIPTION

Figure 1A:
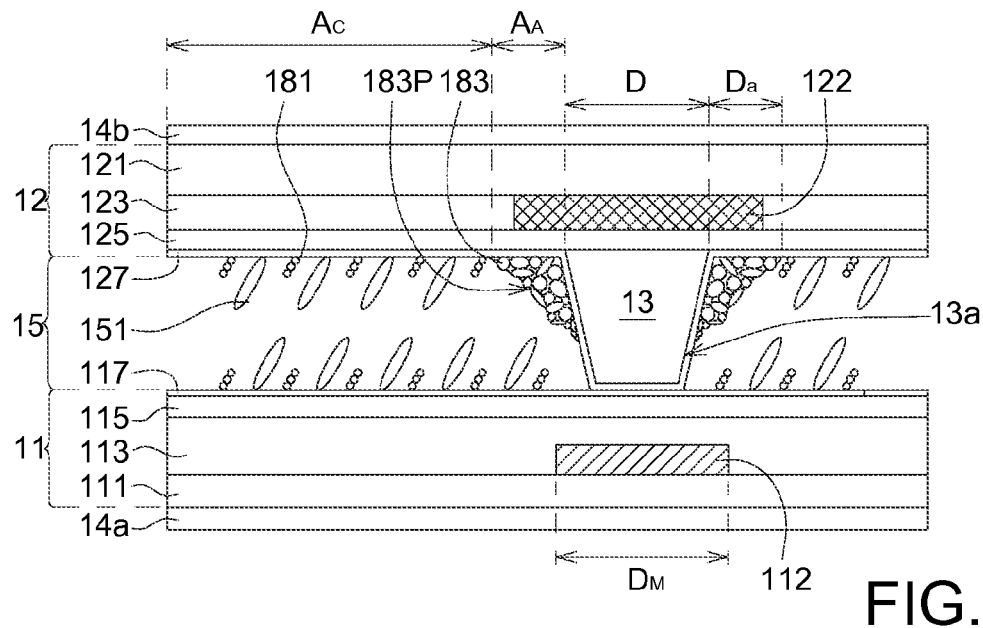
FIG. 1A is a cross-sectional view of a display panel according to the first embodiment of the present disclosure.

In the embodiment of the present disclosure, a display panel is disclosed with the agglomerates surrounding the spacers to change the pre-tilted angles of the liquid crystal molecules. Conventionally, the original pre-tilted angles of the liquid crystal molecules are affected by the profiles of the spacers. With the agglomerates of the embodiment, the liquid crystal molecules adjacent to the agglomerates are pressed by the propelling force from the agglomerates, and the pre-tilted angles of the liquid crystal molecules adjacent to the agglomerates are altered consequently. According, the regions of light leakage corresponding to the peripheries of the spacers are reduced, thereby improving the light leakage of the display panel in the dark state.

The embodiments are described in details with reference to the accompanying drawings. It is noted that the details of the structures of the embodiments are provided for exemplification, and the described details of the embodiments are not intended to limit the present disclosure. The identical and/or similar elements of the embodiments are designated with the same and/or similar reference numerals. It is noted that not all embodiments of the invention are shown. Modifications and variations can be made to meet the requirements of the practical applications. Thus, there may be other embodiments of the present disclosure which are not specifically illustrated. Further, the accompany drawings are simplified for clear illustrations of the embodiment; sizes and proportions in the drawings are not directly proportional to actual products, and shall not be construed as limitations to the present disclosure. Thus, the specification and the drawings are to be regard as an illustrative sense rather than a restrictive sense.

Figure 1B:
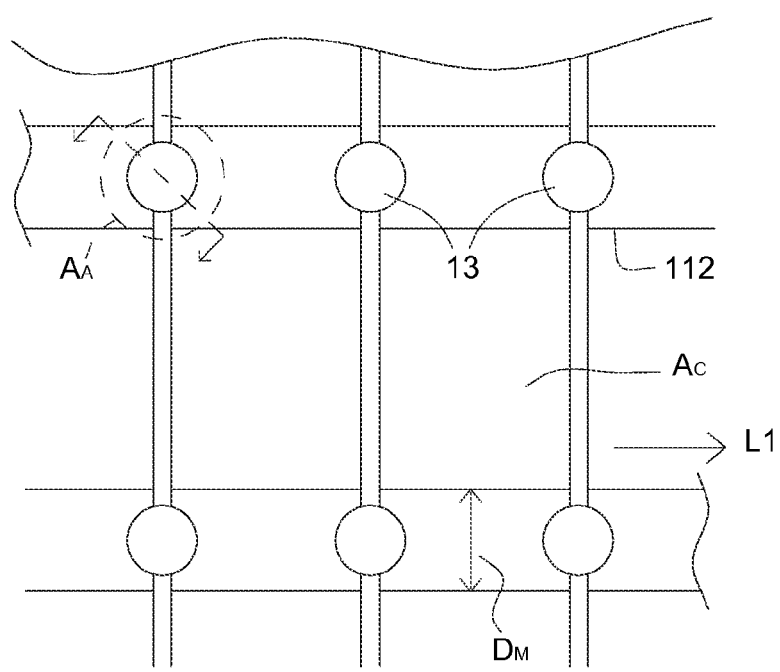
FIG. 1B illustrates part of the display panel of FIG. 1A.

FIG. 1A is a cross-sectional view of a display panel according to the first embodiment of the present disclosure. FIG. 1B illustrates part of the display panel of FIG. 1A. In the first embodiment, the display panel comprises a first substrate 11, a second substrate 12, and a liquid crystal layer 15 disposed between the first substrate 11 and the second substrate 12. The first substrate 11 and the second substrate 12 could be a TFT substrate and a CF substrate, respectively; and this structure is also taken for exemplifying the display panel of the first embodiment. However, the details of the exemplified display panel in the first embodiment structure are not provided for limiting the scope of protection of the disclosure. Alternatively, the first substrate 11 could be a CF substrate, and the second substrate 12 could be a TFT substrate; the disclosure has not particular limitation thereto.

As shown in FIG. 1A and FIG. 1B, the first substrate 11 comprises a first base 111, a first transparent conductive layer 115 and a first alignment film 117 formed on the first transparent conductive layer 115. Material such as polyimide (PI) can be used for fabricating the first alignment film 117. The first transparent conductive layer 115 can be an ITO layer, which is deposited and patterned to create the pixel electrodes. The first substrate 11 further comprises a plurality of patterned conductive traces 112 and a plurality of thin film transistors (TFTs, not shown in Figures) formed on the first base 111, and a first interlayer 113 positioned between the first base 111 and the first transparent conductive layer 115. The first interlayer 113 encapsulates the patterned conductive traces 112. The typical layer construction and disposition of the first substrate 11 are known to the people skilled in the art, so that it is not redundantly described herein.

As shown in FIG. 1A, the second substrate 12 of an embodiment comprises a second base 121, a second transparent conductive layer 125 and a second alignment film 127 formed on the second transparent conductive layer 125. Material such as polyimide (PI) can be used for fabricating the second alignment film 127. The second transparent conductive layer 125 can be an ITO layer. The second substrate 12 further comprises a light-shielding patterned layer 122 (for example, the black matrix, BM) and a color filter photoresist layer 123 formed on the second base 121. According to the first embodiment, the second substrate 12 further comprises a plurality of spacers 13 formed on the second transparent conductive layer 125, and the second alignment film 127 contacts and covers the spacers 13. Setting the spacers 13 maintains a uniform gap (i.e. cell gap) between the first substrate 11 and the second substrate 12, and liquid crystal material is filled in the gap to form the liquid crystal layer 15.

Furthermore, a first polarizer 14a and a second polarizer 14b are attached to the exterior sides of the first base 111 and the second base 121, respectively.

In the embodiment, the display panel further comprises a plurality of agglomerates 183 positioned between the first alignment film 117 and the second alignment film 127, and the agglomerates 183 are formed at the regions adjacent to the spacers 183 and surround the spacers 183. In one embodiment, the agglomerates 183 closer to the spacer 13 for being surrounded is more intensive than the agglomerates 183 farther to the spacer 13 for being surrounded, as shown in FIG. 1. Also, a degree of polymerization of the agglomerates 183 closer to the spacer 13 be surrounded is higher than a degree of polymerization of the agglomerates 183 farther to the spacer 13 be surrounded. Moreover, a distribution profile 183P of the agglomerates 183 is slanted to a lateral surface 13a of the spacer 13.

Figure 2A:
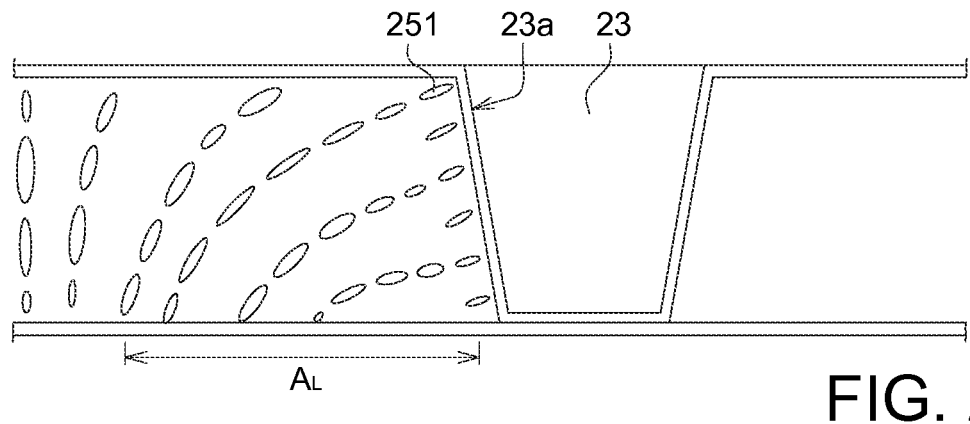
FIG. 2A illustrates a spacer of a conventional normal-black display panel, and no agglomerates is formed adjacent to the spacer.
Figure 2B:
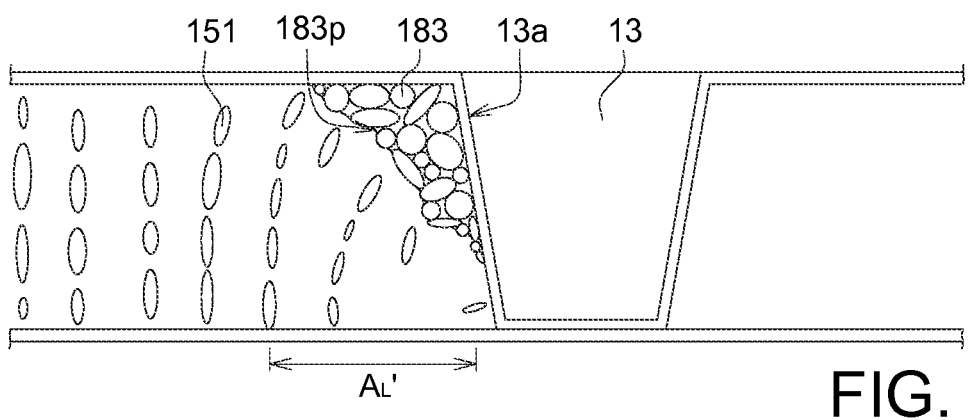
FIG. 2B illustrates a spacer of a display panel of the embodiment, and the agglomerates surround the spacer.

Please also refer to FIG. 2A and FIG. 2B. FIG. 2A illustrates a spacer of a conventional normal-black display panel, and no agglomerates is formed adjacent to the spacer. When the conventional normal-black display panel is in the dark state (i.e. no voltage applied across the display panel), the long axes of the liquid crystal (LC) molecules 251 are perpendicular to the surface contacting the LC molecules 251, and the orientation of the LC molecules 251 vary continuously. When the surface of the spacers 23 induces the large LC tilted angles of the LC molecules 251, there is a region of light leakage AL generated near the spacer 23. FIG. 2B illustrates a spacer of a display panel of the embodiment, and the agglomerates surround the spacer. In FIG. 2B, the agglomerates 183 are created in the display panel of the embodiment, and parts of the LC molecules 151 (close to the spacer 23) are tilted along the uneven distribution profile 183P of the agglomerates 183. Compared to the LC molecules 251 of FIG. 2A, the uneven distribution profile 183P of the agglomerates 183 has effect on the pre-tilted angles of the LC molecules 151 of FIG. 2B, and the tilted angles of the LC molecules 151 are smaller than that of the LC molecules 251, thereby reducing the region of light leakage. Accordingly, the region of light leakage AL' generated near the spacer 13 of the embodiment (FIG. 2B) is smaller than the region of light leakage AL generated near the spacer 23 of the conventional display panel (FIG. 2A).

In one embodiment, the display panel is a polymer-stabilized aligned (PSA) display panel. In the fabrication of PSA display panel, a mixture of the LC molecules 151 and the monomers (ex: a controlled amount of UV-curable reactive monomers) is disposed between the substrates. In the absence of an applied voltage, the LC molecules 151 are aligned vertically and the monomers randomly distributed. When a voltage is applied (ex: slightly above a threshold voltage, Vth), the LC molecules 151 close to the first alignment film 117 and the second alignment film 127 are tilted in the pre-tilted angles (i.e. the long axes of the LC molecules 151 close to the alignment films are parallel to the applied electrical field). In the voltage applied situation, the cell is exposed to the UV light with an adequate intensity for a sufficient time, and then the monomers are polymerized at the surfaces of the first alignment film 117 and the second alignment film 127. During polymerization, the growing polymer chains composed of monomers at the alignment films are also aligned along the long axes of the LC molecules. Even though the applied voltage was removed, the LC molecules 151 are anchored with a certain pre-tilted angle due to the polymerization of the monomers. Accordingly, a multi-domain vertical-alignment LC display panel is successfully achieved by using the polymer chains for stabilizing the LC molecules.

According to an embodiment, after the monomers are subjected to the UV-light irradiation under the controlled electrical field, a plurality of polymer chains 181 are formed in a uniform distribution and orderly aligned on the first alignment film 117 and the second alignment film 127 for restricting the pre-tilted angles of the LC molecules, thereby constituting the display domain. Also, the polymer agglomerates 183 of the embodiment with higher agglomeration and degree of polymerization can be formed around the spacer 13 through the control of electrical field and the structural design of patterned layers. Since the uneven distribution profile 183P of the polymer agglomerates 183 around the spacer 13 press the adjacent LC molecules, it prevents the LC molecules near the spacer 13 from being tilted in a large angle along the profile of the spacer 13. Moreover, the polymer agglomerates of the embodiment provide the LC molecules 151 the resistive force against the pressure from the profile of the spacer 13. Accordingly, the regions of light leakage corresponding to the peripheries of the spacers 13 are reduced. In one embodiment, the agglomerates 183 are formed by the same material of the polymer chains 181 for stabilizing the LC pre-tilted.

Accordingly to one embodiment, an orientation patterned polymer layer includes the orientation regions $A_C$ comprising the polymer chains 181 in the alignment films, and the agglomeration regions $A_A$ comprising polymer agglomerates 183. The agglomeration regions $A_A$ are positioned between the spacers 13 and the orientation regions $A_A$, and the polymer agglomerates 183 surround the spacers 13. More specifically, a degree of polymerization in the agglomeration region $A_A$ is higher than a degree of polymerization in the orientation region $A_C$.

Moreover, the sizes of the polymer chain 181 of the orientation region $A_C$ are nanometer degree, while the sizes of the polymer agglomerates 183 of the agglomeration region $A_A$ are micro-meter degree according to the embodiment. Therefore, a surface roughness of the agglomeration region $A_A$ is larger than a surface roughness of the orientation region $A_C$ of the orientation patterned polymer layer in the embodiment. Also, in one embodiment, the particles of the polymer chain 181 are typically no more than 100 nm in size. In one embodiment, the sizes of the polymer agglomerates 183 are distributed in a range of about 0.1 μm~2 μm.

Additionally, in one embodiment, if a width of vertical projection of one of the spacers 13 (such as cylinder or other shapes) on the second substrate 12 is defined as D, as shown in FIG. 1A, the width $D_a$ of vertical projection of the agglomeration region $A_A$ surrounded the one of the spacers on the second substrate 12 would be in a range of D/2 to D/4.

However, the disclosure is not limited to the values described above. The sizes and distribution range (i.e., $D_a$) of the polymer agglomerates 183 could be changed by adjusting the process conditions, depending on the different structural requirements of the practical applications, for changing the sizes of the agglomerates 183 as well as modifying the width of vertical projection of the agglomeration region $A_A$ on the second substrate 12 (i.e., $D_a$), thereby achieving the purpose of reducing the region of light leakage.

In one embodiment, the patterned conductive traces 112 and the TFTs are disposed between the first base 111 and the first alignment film 117. Please refer to FIG. 1B. In one embodiment, the patterned conductive traces 112 disposed between the first base 111 and the first alignment film 117 can be a pattern of the gate electrode or a pattern of the storage capacity. Those patterned conductive traces 112 are spaced apart and arranged in parallel by extending along a first direction L1. In embodiment, the spacers are arranged along the extending direction of the patterned conductive traces 112 (ex: gate electrode), by viewing from a top side of the display panel. Thus, a vertical projection of the agglomerates in the agglomeration region $A_A$ on the second substrate 12 (ex: the width of $D_a$) at least partially overlaps with vertical projections of the patterned conductive traces 112 on the second substrate 12. In one embodiment, a largest width $D_M$ (as shown in FIG. 1B) of the patterned conductive traces 112 vertical to the first direction L1 is no less than 10 μm and not larger than 50 μm.

In the practical applications, the agglomerates of the embodiment can be created in several ways. For example, the electrical field can be increased during the polymerization (ex: a period of monomers joined by covalent bonds), or providing a patterned transparent conductive layer with a designed pattern (such as openings) adjacent to the spacers for increasing the electrical field near the spacers. Alternatively, an uneven light irradiation approach can be implemented for inducing abnormal polymerization near the spacer, by providing a light-shielding pattern (ex: a metal pattern) in the midway of UV-light irradiation (for partially blocking the light) to cause an uneven effect of light irradiation.

Figure 3A:
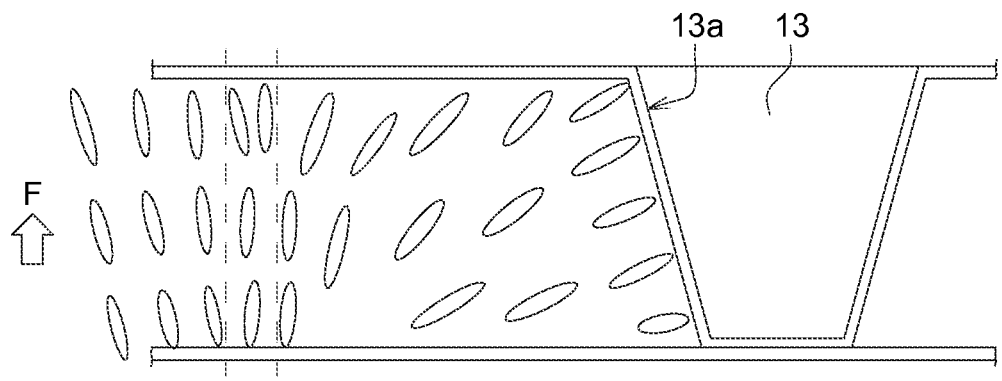
FIG. 3A illustrates the arrangement of the liquid crystal (LC) molecules in a display panel under the influence of an electrical filed F during the polymerization.
Figure 3B:
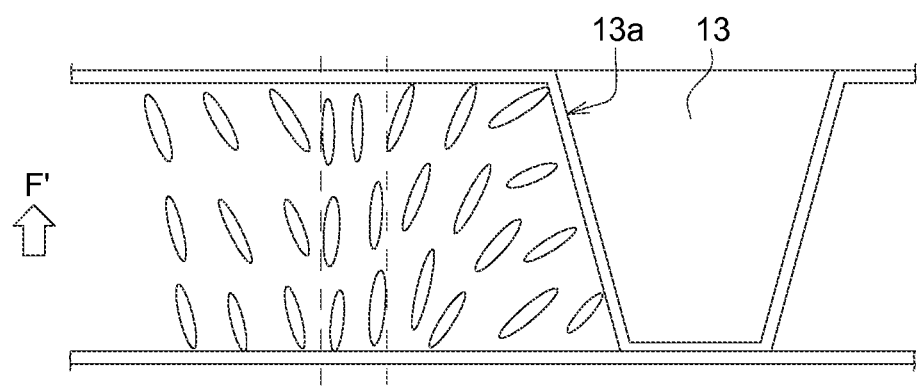
FIG. 3B illustrates the arrangement of the liquid crystal (LC) molecules in a display panel under the influence of an electrical filed F' during the polymerization, and F'>F.

One of the technical methods for creating the agglomerates of the embodiment by increasing the electrical field during the polymerization is described below, with reference to the accompanying drawings of FIG. 3A and FIG. 3B. FIG. 3A illustrates the arrangement of the liquid crystal (LC) molecules in a display panel under the influence of an electrical filed F during the polymerization. In FIG. 3A, the LC molecules tilt along the surface 13a of the spacer 13. FIG. 3B illustrates the arrangement of the liquid crystal (LC) molecules in a display panel under the influence of an electrical filed F' during the polymerization, and F'>F. By increasing the electrical field during the polymerization, the titled angles of the LC molecules are more vertically aligned and the force for pushing the LC molecules against the spacer 13 is strengthened, thereby inducing causing the LC molecules in serious disarray around the spacers 13, as shown in FIG. 3A and FIG. 3B. Therefore, the polymers near the spacer 13 tend to agglomerate abnormally (i.e. different from the not overly dense distribution of the polymer chains 181) to form the agglomerates 183 surrounding the spacer 13 after polymerization.

An alternative technical method for creating the agglomerates of the embodiment is to provide a patterned transparent conductive layer with a designed pattern (such as openings) and/or a light-shielding pattern (ex: a metal pattern) for causing the LC molecules around the spacers 13 in the disarray state. Please refer to FIG. 4 and FIG. 5.

Figure 4:
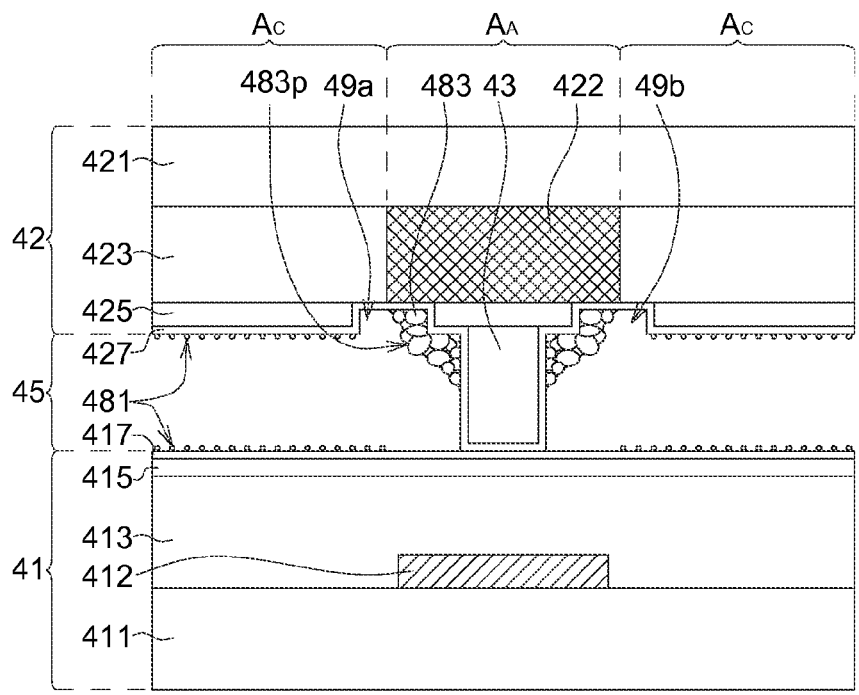
FIG. 4 is a cross-sectional view of a display panel according to the second embodiment of the present disclosure.

FIG. 4 is a cross-sectional view of a display panel according to the second embodiment of the present disclosure. Similar to the first embodiment, the display panel of FIG. 4 comprises a first substrate (ex: TFT substrate) 41, a second substrate (ex: CF substrate) 42, and a liquid crystal layer 45 disposed between the first substrate 41 and the second substrate 42. The first substrate 41 comprises a first base 411, a first transparent conductive layer 415 (such as ITO) and a first alignment film 417 formed on the first transparent conductive layer 415. The first substrate 41 further comprises The first substrate 11 further comprises several patterned conductive traces 412 formed on the first base 411, and a first interlayer 413 positioned between the first base 411 and the first transparent conductive layer 415. The first interlayer 413 encapsulates the patterned conductive traces 412. Similarly, the second substrate 42 comprises a second base 421, a second light-shielding patterned layer (ex: BM) 422, a second interlayer 423, a second transparent conductive layer (ex: ITO)

425, a second alignment film 427 formed on the second transparent conductive layer 425, and the spacers 43 formed on the second transparent conductive layer 425. Also, the second alignment film 427 contacts and covers the spacer 43.

In the second embodiment, the second transparent conductive layer 425 has a plurality of openings respectively formed between two of the spacers 43. As shown in FIG. 4, the openings 49a and 49b are disposed adjacent to the spacer 43 to facilitate control of the electrical field near the spacer 43 during the polymerization, thereby inducing a disorder polymerization around the spacer 43. After the monomers are subjected to the UV-light irradiation under the control of the electrical field, the orientation regions $A_C$ comprising the polymer chains 481 and the agglomeration regions $A_A$ comprising polymer agglomerates 483 are formed consequently. The polymer agglomerates 483 surround the spacer 43. The distribution profile 483P constituted by the polymer agglomerates 483 is slanted to the surface of the spacer 43, for pressing and leading the LC molecules near the spacer 43 to a more vertical alignment. Therefore, the region of light leakage adjacent to the spacer 43 is capable of being reduced.

Moreover, the closer the agglomerates 483 to the top of the spacer 43 (i.e. closer to the second base 412), the higher the agglomeration and the degree of polymerization of the agglomerates 483. The farther the agglomerates 483 to the bottom of the spacer 43 (i.e. closer to the first base 411), the lower the agglomeration and the degree of polymerization of the agglomerates 483. In one embodiment, a surface roughness of the agglomeration region $A_A$ is larger than a surface roughness of the orientation region $A_C$. In one embodiment, the sizes of the agglomerates 483 are distributed in a range of about 0.1 μm~2 μm.

Figure 5:
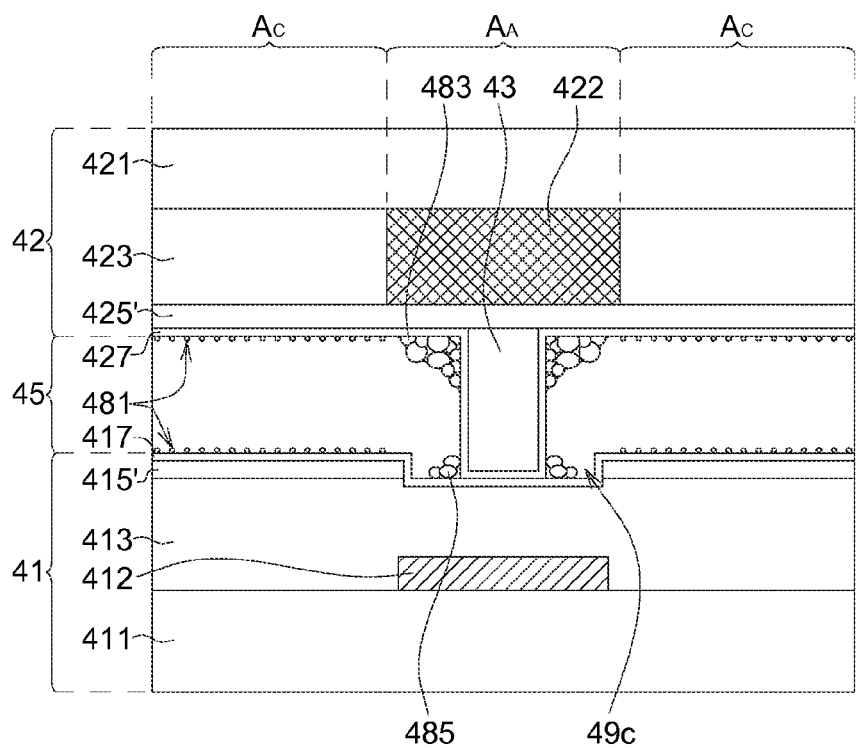
FIG. 5 is a cross-sectional view of a display panel according to the third embodiment of the present disclosure.

FIG. 5 is a cross-sectional view of a display panel according to the third embodiment of the present disclosure. The display panels of the third and second embodiments are identical, except the opening 49c is formed at the first transparent conductive layer 415' and the spacer 43 is positioned corresponding to the opening 49c in the third embodiment. No opening is formed at the second transparent conductive layer 425' in the third embodiment. Also, the light-shielding effect of the patterned conductive traces 412 (ex: the incident UV light is typically irradiated from the side of TFT substrate) cause an uneven light irradiation during polymerization. The structure comprising the opening near the spacer 43 and the light shielding layer, which causes a more irregular alignment of the LC molecules and the uneven light irradiation arrangement, can be implemented for inducing an abnormal polymerization near the spacer 43, so as to form the polymer agglomerates 483 between the first alignment film 417 and the second alignment film 427 and surround the spacer 43 after polymerization. As shown in FIG. 5, there are large numbers of the polymer agglomerates 483 surrounding the spacer 43 near the second alignment film 427, and small numbers of the polymer agglomerates 485 surrounding the spacer 43 near the first alignment film 417.

According to the aforementioned descriptions, the agglomerates formed around the spacers of the display panel in the embodiment create a distribution profile slanted to the surface of the spacer, so that part of the LC molecules (ex: close to the second alignment film 127/427), originally aligned along the surface of the spacer, are now aligned along the distribution profile of the agglomerates in the dark state. Accordingly, the agglomerates of the embodiment lead the LC molecules near the spacers to the more vertical pre-tilted angles in the dark state, thereby reducing the regions of light leakage near the spacers. The defect of light leakage near the spacers generally occurred in the conventional display panel is consequently improved. Additionally, the several techniques for forming the agglomerates of the embodiment (as presented above) are compatible with the current procedures for fabricating the PSA (polymer stabilized alignment) display panel, which would not complicate the manufacturing method of the display panel of the embodiment and raise the production cost. Therefore, the display panel with agglomerates according to the embodiment is compatible for the current procedures and suitable for the mass production.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
   a first substrate, having a first alignment film;
   a second substrate, having a second alignment film and a plurality of spacers, the second alignment film disposed oppositely to the first alignment film, and the second alignment film contacting and covering the spacers, wherein the spacers maintain a substantially uniform gap between the first substrate and the second substrate;
   a liquid crystal layer, disposed between the first substrate and the second substrate; and
   a plurality of agglomerates positioned between the first alignment film and the second alignment film, and the agglomerates surrounding at least one of the spacers, wherein sizes of the agglomerates are in a range of 0.1 μm~2 μm.

2. The display panel according to claim 1, wherein the agglomerates closer to the spacer for being surrounded is more intensive than the agglomerates farther to the spacer for being surrounded.

3. The display panel according to claim 1, wherein a distribution profile of the agglomerates is slanted to a lateral surface of the spacer.

4. The display panel according to claim 1, wherein a width of vertical projection of at least one of the spacers on the second substrate is defined as D, a width of vertical projection of the agglomerates surrounded said at least one of the spacers on the second substrate is in a range of D/2 to D/4.

5. The display panel according to claim 1, wherein the first substrate comprises a first base, a plurality of patterned conductive traces and a plurality of thin film transistors (TFTs), the patterned conductive traces and the TFTs are disposed between the first base and the first alignment film, and the patterned conductive traces are spaced apart and arranged in parallel by extending along a first direction, a vertical projection of the agglomerates on the second substrate at least partially overlaps with vertical projections of the patterned conductive traces on the second substrate.

6. The display panel according to claim 1, wherein the second substrate further comprises a transparent conductive layer, the second alignment film covers the transparent conductive layer, and the transparent conductive layer has a plurality of openings respectively formed between two of the spacers.

7. The display panel according to claim 1, wherein the second substrate comprises a second base, a plurality of patterned conductive traces and a plurality of thin film transistors (TFTs), the patterned conductive traces and the TFTs are disposed between the second base and the second alignment film, and the patterned conductive traces are spaced apart and arranged in parallel by extending along a first direction, a vertical projection of the agglomerates on the second substrate at least partially overlaps with vertical projections of the patterned conductive traces on the second substrate.

8. The display panel according to claim 1, wherein the agglomerates are formed by polymers same as material for stabilizing liquid crystals pre-tilt.

9. A display panel, comprising:
a first substrate, comprising a first alignment film formed on a surface of a first base;
a second substrate, comprising a second base apart from the first base, a second alignment film and a plurality of spacers formed on a surface of the second base, the second alignment film disposed oppositely to the first alignment film and contacting and covering the spacers, and the spacers disposed between the first base and the second base for maintaining a substantially uniform gap between the first base and the second base;
a liquid crystal layer, disposed between the first alignment film and the second alignment film;
an orientation patterned polymer layer, distributed on the first alignment film and the second alignment film and contacting the liquid crystal layer, and the orientation patterned polymer layer comprising:
a plurality of orientation regions; and
a plurality of agglomeration regions, respectively positioned between the spacers and the orientation regions;
wherein a surface roughness of the agglomeration regions is larger than a surface roughness of the orientation regions of the orientation patterned polymer layer.

10. The display panel according to claim 9, wherein a width of vertical projection of one of the spacers on the second substrate is defined as D, and a width of vertical projections of the agglomeration region near said one of the spacers on the second substrate is in a range of D/2 to D/4.

11. The display panel according to claim 9, wherein the orientation patterned polymer layer is made up of monomers through polymerization, and a degree of polymerization in the agglomeration regions is higher than a degree of polymerization in the orientation regions.

12. The display panel according to claim 9, wherein a distribution profile of the agglomeration regions is slanted to a lateral surface of the spacer.

13. The display panel according to claim 9, wherein the first substrate comprises a plurality of patterned conductive traces disposed between the first base and the first alignment film, and the patterned conductive traces are spaced apart and arranged in parallel by extending along a first direction, a vertical projection of the agglomeration regions on the second substrate at least partially overlaps with vertical projections of the patterned conductive traces on the second substrate.

14. The display panel according to claim 9, wherein the second substrate further comprises a transparent conductive layer, the second alignment film covers the transparent conductive layer, and the transparent conductive layer has a plurality of openings respectively formed between two of the spacers.

15. The display panel according to claim 9, wherein the agglomerates are formed by polymers same as material for stabilizing liquid crystals pre-tilt.

16. A display panel, comprising:
a first substrate, having a first alignment film;
a second substrate, having a second alignment film and a plurality of spacers, the second alignment film disposed oppositely to the first alignment film, and the second alignment film contacting and covering the spacers, wherein the spacers maintain a substantially uniform gap between the first substrate and the second substrate;
a liquid crystal layer, disposed between the first substrate and the second substrate; and
a plurality of agglomerates positioned between the first alignment film and the second alignment film, and the agglomerates surrounding at least one of the spacers, wherein a degree of polymerization of the agglomerates closer to the spacer for being surrounded is higher than a degree of polymerization of the agglomerates farther to the spacer for being surrounded.

17. The display panel according to claim 16, wherein the second substrate further comprises a transparent conductive layer, the second alignment film covers the transparent conductive layer, and the transparent conductive layer has a plurality of openings respectively formed between two of the spacers.

18. The display panel according to claim 16, wherein the agglomerates are formed by polymers same as material for stabilizing liquid crystals pre-tilt.

* * * * *